(12) United States Patent  (10) Patent No.: US 8,244,206 B1
Hines, III et al.  (45) Date of Patent: Aug. 14, 2012

(54) DETERMINING MOBILE DEVICE LOCATION CAPABILITIES

(75) Inventors: Thomas Edward Hines, III, Belton, MO (US); Victoria L. Zeller, Kansas City, MO (US); Kevin D. Bowles, Lenexa, KS (US); Larry R. Dreiling, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1191 days.

(21) Appl. No.: 12/045,893

(22) Filed: Mar. 11, 2008

(51) Int. Cl.
*H04M 11/04* (2006.01)

(52) U.S. Cl. .................... 455/404.2; 342/357.2
(58) Field of Classification Search ............... 455/404.2; 707/606–609
See application file for complete search history.

(56) References Cited

U.S. PATENT DOCUMENTS

| 7,054,611 | B2 | 5/2006 | Eisner et al. |
| 2004/0192271 | A1 | 9/2004 | Eisner et al. |
| 2005/0180346 | A1* | 8/2005 | Benes et al. .................. 370/310 |
| 2007/0252761 | A1* | 11/2007 | Koorapaty et al. ........... 342/464 |
| 2008/0153483 | A1* | 6/2008 | Abu-Amara ............... 455/432.1 |

* cited by examiner

*Primary Examiner* — Marcos Batista

(57) ABSTRACT

A method of operating a communication system to process emergency service calls is disclosed. A call request for an emergency service call from a mobile communication device is received. The call request includes a device identifier for the mobile communication device. A location capability database is queried using the device identifier to determine if the device identifier is in the location capability database. A default location capability is assigned if the device identifier is not in the location capability database. A location of the mobile communication device is determined using the default location capability if the device identifier is not in the location capability database.

13 Claims, 6 Drawing Sheets

DETERMINING MOBILE DEVICE LOCATION CAPABILITIES

TECHNICAL BACKGROUND

Telecommunication carriers are required by government regulations to provide emergency calling services to their customers. In the United States and Canada, 911 is the official emergency phone number that callers can dial in order to reach dispatch personnel at a public safety answering point (PSAP). When a caller dials 911 from a telephone, the call is routed by a carrier to receiving equipment at a PSAP facility. A dispatcher at the facility answers the call and assists the caller with their emergency.

Often times, dispatchers must dispatch first responder personnel to the scene of an emergency to render assistance to callers. In the past, dispatchers had to ask a caller for his location. Over time, most telecommunication carriers developed the capability to automatically determine the location of caller who dialed 911 via a landline. For instance, 911 callers on a landline can be located based on their phone number. In the case of broadband 911 voice calls, callers can be located based on the identity of their broadband equipment.

During the course of a 911 call made from a mobile phone, a PSAP or other emergency services provider may request the carrier determine the approximate location of a mobile 911 caller. Once the carrier determines an approximate location of a mobile caller, this information may be relayed to the PSAP. This approximate location may also be used to determine which PSAP should receive the 911 call.

OVERVIEW

A method of operating a communication system to process emergency service calls is disclosed. A call request for an emergency service call from a mobile communication device is received. The call request includes a device identifier for the mobile communication device. A location capability database is queried using the device identifier to determine if the device identifier is in the location capability database. A default location capability is assigned if the device identifier is not in the location capability database. A location of the mobile communication device is determined using the default location capability if the device identifier is not in the location capability database.

A communication system that processes emergency service calls is disclosed. An emergency service call receiver receives a call request for an emergency service call and a device identifier from a mobile communication device. A location capability database is indexed using the device identifier. A default location capability is assigned by the communication system if the device identifier is not in the location capability database. Location determining equipment determines a location of the mobile communication device using the default location capability.

A method of providing a location capability of a mobile communication device that has placed a call request for an emergency service call to a communication system is disclosed. A database comprising an association of device identifiers to device location capability wherein less than a predetermined percentage of the database entries correspond to a default location capability is maintained. The database is queried with a device identifier received from the mobile communication device. A device location capability is supplied to location determining equipment if the device identifier was found in the database. A default location capability is supplied to the location determining equipment if the device identifier was not found in the database. An emergency service provider is supplied with a location provided by the location determining equipment. The location supplied to the emergency service provider corresponds to the location of the mobile communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
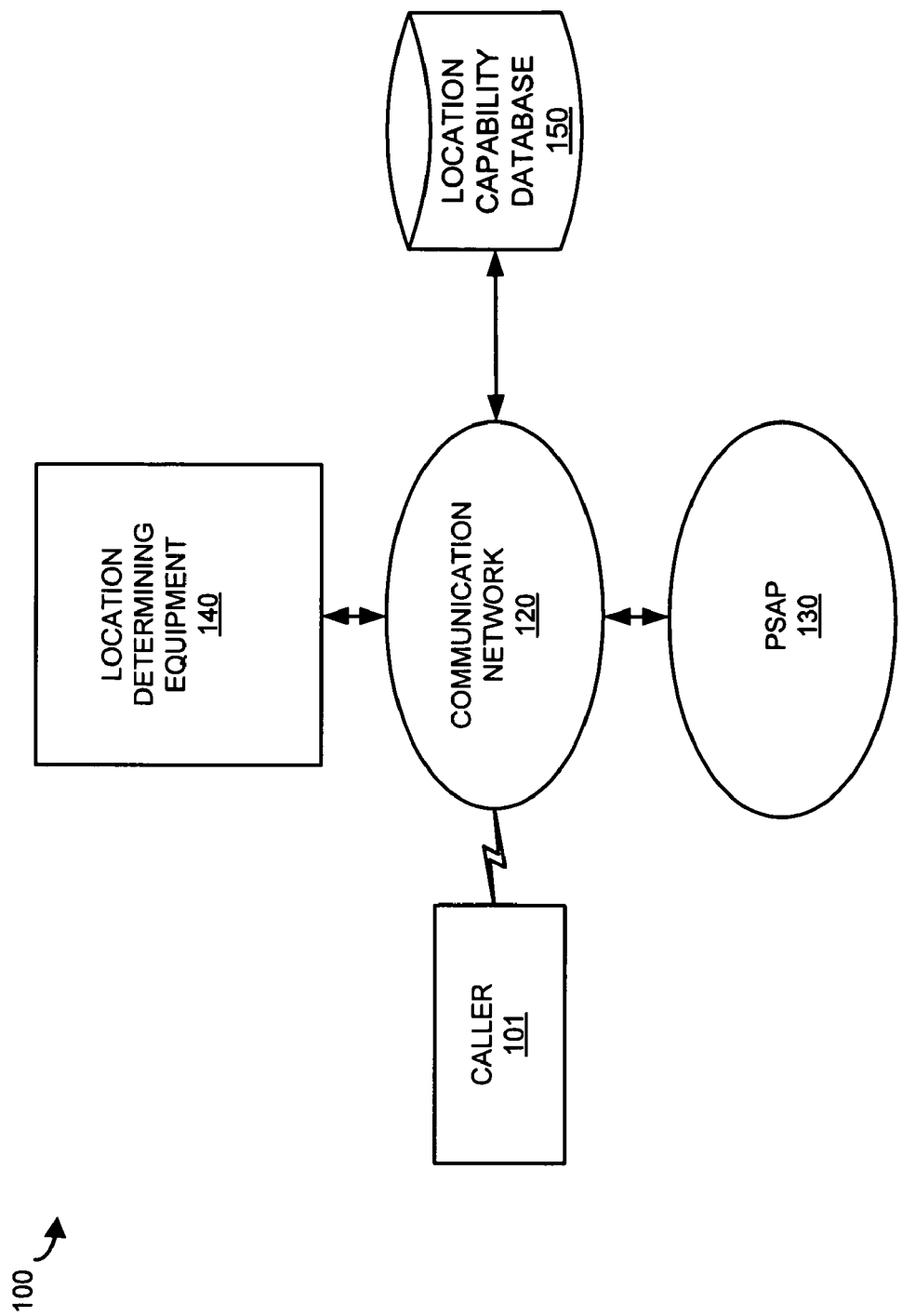
FIG. 1 is a block diagram illustrating a communication system that processes emergency service calls.

FIG. 1 is a block diagram illustrating a communication system that processes emergency service calls. Communication network 100 comprises caller 101, communication network 120, public safety answering point (PSAP) 130, location determining equipment (LDE) 140, and location capability database 150. Caller 101 is operatively coupled to communication network 120. Location capability database 150 is operatively coupled with LDE 140. PSAP 130 is also operatively coupled with communication network 120 and thereby also operatively coupled with caller 101 and LDE 140.

Communication network 120 could be any network or collection of networks that couple, link, or otherwise operatively link caller 101 with other callers or PSAP 130. It should be understood that communication network 120 may also link PSAP 130 with LDE 140, or LDE 140 and location capability database 150. In addition, other secondary data networks could be used. In an example, communication network 120 may include a backhaul network, a wireless network, a local network, a long distance network, a packet network, or any combination thereof, as well as other types of networks.

Caller 101 may be any device, system, or other such communication platform capable of communicating with LDE 140 or PSAP 130 over communication network 120. Caller 101 may be, for example, a mobile phone, a wireless phone, a personal digital assistant (PDA), a wireless modem, or any combination thereof, as well as any other type of device or system. Other types of communication platforms are possible.

LDE 140 may be part of, for example, a mobile switching center (MSC), a soft switch, a media gateway controller, or any combination or variation thereof, as well as another type of call locating system. Location determining equipment 140 could be any system or collection of systems, capable of determining an approximate location of callers to emergency services and providing that location to communication network 120 or PSAP 130.

It should be understood that location determining equipment 140 may include additional elements not pictured for the sake of clarity. For example, position determining equipment may be included. Furthermore, a gateway system may be included to interface between PSAP 130 and location determining equipment 140. An example of a gateway is an automatic location identification gateway or database query engine.

Communication network 120 receives a call request from caller 101 for an emergency service call. Once set up, this emergency service call may be coupled by communication network 120 to PSAP 130. As part of this call request or a call setup, communication network 120 may receive an electronic serial number (ESN), mobile equipment identifier (MEID), or international mobile equipment identifier (IMEI).

An ESN is the unique identification number embedded or inscribed in a microchip in a wireless phone by the manufacturer. Each time a call is placed, the ESN is automatically transmitted to communication network 120 so that the call's validity may be checked. The ESN cannot easily be altered in the field.

An MEID or IMEI is a globally unique identification number for a physical piece of mobile station equipment. MEIDs or IMEIs are 'burned' into a device, to be resistant to modification. MEIDs and IMEIs are used as a means to facilitate mobile equipment identification and tracking. MEIDs and IMEIs are capable of being transmitted over the air upon a request from the network.

Communication network 120 may derive a device identifier from all or part of an ESN, MEID, or IMEI. In an alternative, all of an ESN, MEID, or IMEI may be used as the device identifier.

The device identifier may be used to query location capability database 150. Location capability database 150 may be queried by communication network 120 to determine if the device identifier is in location capability database 150. Location capability database 150 may also be queried by communication network 120 to retrieve a stored location capability.

In an embodiment, location capability database 150 may contain stored entries that detail an association between each device identifier and a location capability. The different location capabilities may include Assisted-GPS (A-GPS), Advanced Forward Link Trilateration (A-FLT), Timing Advance/Network Measurement Report (TA/NMR), or Enhanced Observed Time Difference (E-OTD). In addition, the location capability database 150 may contain entries that correspond to legacy devices without any location capability in the device.

Each of the capabilities may be assigned a number in location capability database 150. For example, zero (0) may correspond to a legacy device without any location capability. One (1) may correspond to a device that has the capability to be located using A-FLT. Two (2) may correspond to a device that has the capability to be located using A-GPS, and so on.

In an embodiment, location capability database 150 is maintained in a manner that limits or excludes entries with a default location capability. For example, device identifier to location capability associations that result in a default location capability of A-GPS may be limited to less than ten percent (10%) of all the entries. In another example, device identifier to location capability associations that result in a default location capability of A-GPS may be excluded altogether. It should be understood that other location capabilities may be chosen as the default location capability.

Communication network 120 may query location capability database 150 to determine if the device identifier is in location capability database 150. If the device identifier is not in location capability database 150, then the default location capability is assigned to be associated with the device identifier and thus caller 101. In this case, the default location capability is provided to LDE 140. LDE 140 uses this default location capability to determine a location of caller 101. The location of caller 101 as determined by LDE 140 may be provided to PSAP 130.

If the device identifier is in location capability database 150, then the stored location capability is assigned to be associated with the device identifier and thus caller 101. In this case, the stored location capability is provided to LDE 140. LDE 140 uses this stored location capability to determine a location of caller 101. The location of caller 101 as determined by LDE 140 may be provided to PSAP 130.

Figure 2:
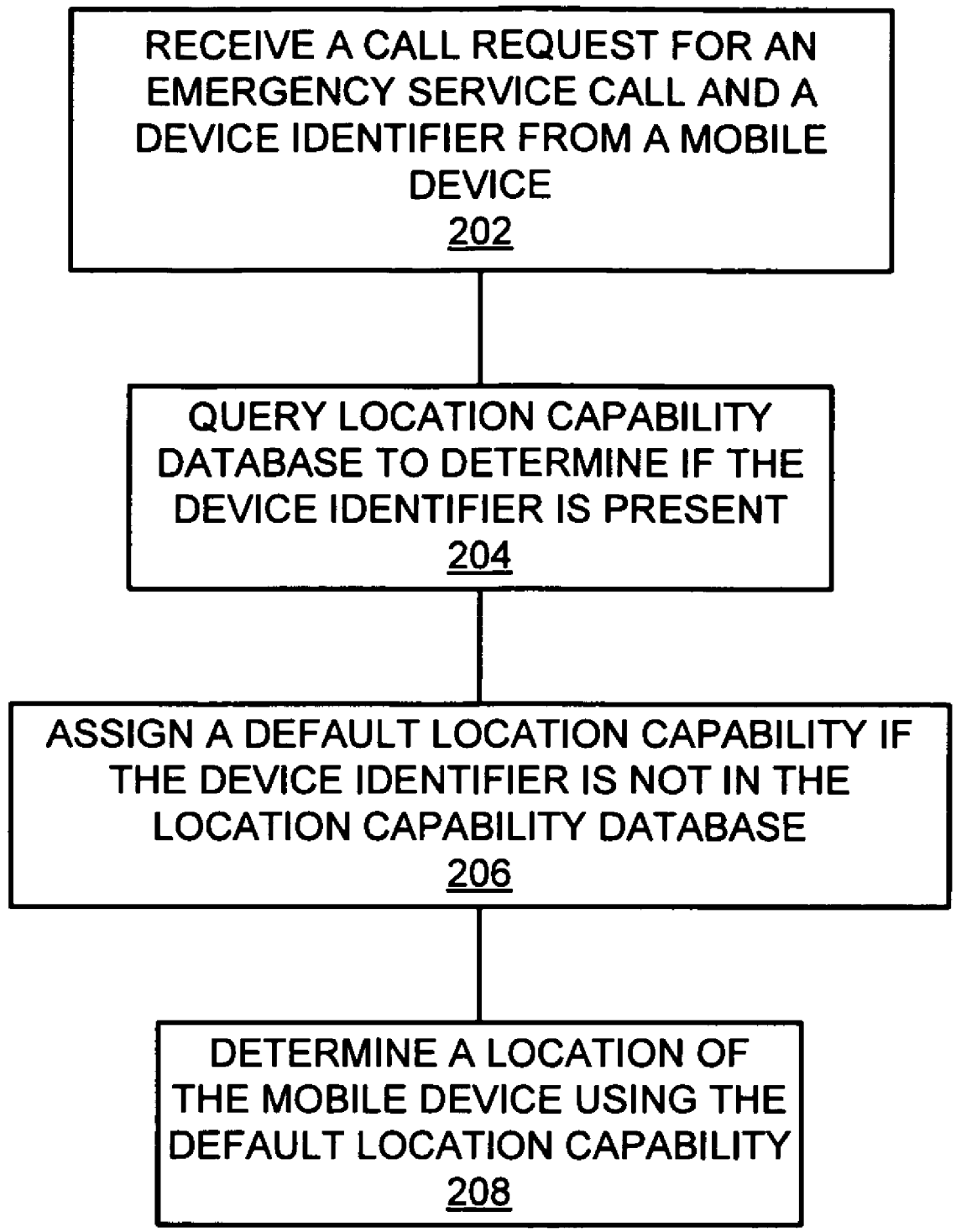
FIG. 2 is a flowchart illustrating a method of operating a communication system to process emergency service calls.

FIG. 2 is a flowchart illustrating a method of operating a communication system to process emergency service calls. The steps illustrated in FIG. 2 may be performed by communication system 100.

A call request for an emergency service call and a device identifier are received from a mobile device (202). For example, network 120 may receive a call request for an emergency service call and a device identifier from caller 101. The device identifier may be derived from all or part of an ESN, MEID, or IMEI. In an alternative, all of an ESN, MEID, or IMEI may comprise the device identifier.

A location capability database is queried to determine if the device identifier is present in the location capability database (204). For example, location capability database 150 may be queried to determine if the device identifier is present in location capability database 150.

A default location capability is assigned if the device identifier is not in the location capability database (206). For example, if the device identifier is not in location capability database 150, then a default location capability is assigned to be associated with the device identifier and thus caller 101. In an example, a default location capability of A-GPS may be assigned to be associated with the device identifier. Thus, the location capability associated with caller 101 would be A-GPS if the device identifier sent by caller 101 was not found in location capability database 150.

A location of the mobile device is determined using the default location capability (208). For example, a location of caller 101 may be determined using the default location capability. In another example, the location of caller 101 may be determined by LDE 140 using the default location capability associated with caller 101 of A-GPS.

It should be understood that some old phones have little to no location capabilities, and there are still many hundreds of thousands of customers that use these phones. Previously, whenever a new phone model was introduced, the location capability database would be updated with the new phone model. Because there are a large number of new models introduced each month, it is time consuming and cumbersome to continually update the location capability database with each new phone model.

Using the aforementioned embodiments however, only older phones with little to no location capabilities are stored in the database. This removes the need to update the database whenever a new phone is introduced. Thus, the process of maintaining the location capability database is simplified and resources are saved.

Calling phones may still be located because rather than look-up the specific location capability of each phone in response to a 911 call, the system checks to see if the model of the calling phone is even in the database. If not, the system assumes that the phone has the most recent capability (e.g. A-GPS) and proceeds to locate the phone using this capability. If the phone is in the database, then the network proceeds to lookup the older location capabilities (if any) that can be used to locate the phone.

Figure 3:
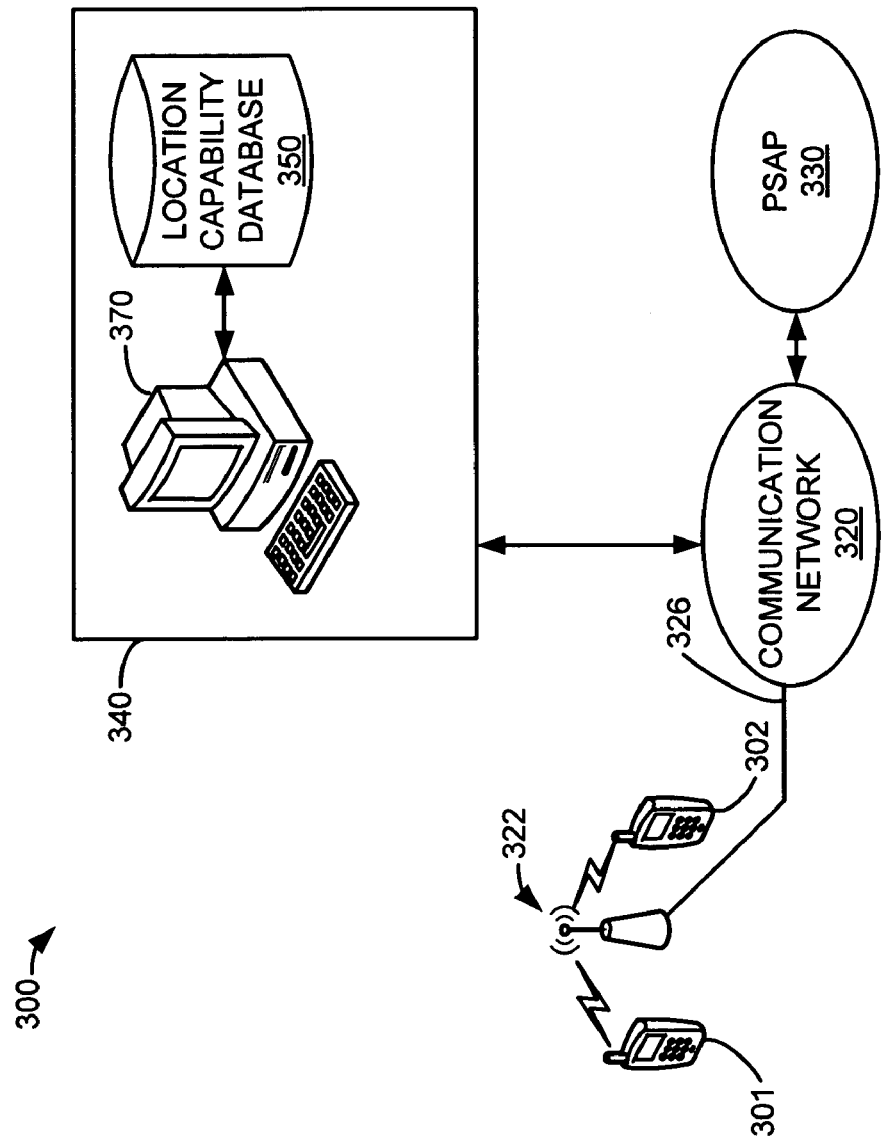
FIG. 3 is a block diagram illustrating a communication system that processes emergency service calls.

FIG. 3 is a block diagram illustrating a communication system that processes emergency service calls. Communication network 300 comprises mobile device 301, mobile device 302, base station 322, link 326, communication network 320, PSAP 330, and LDE 340. LDE 340 includes computer system 370 and location capability database 350.

Mobile device 301 is operatively coupled to communication network 320 via base station 322 and link 326. Mobile device 302 is operatively coupled to communication network 320 via base station 322 and link 326. PSAP 330 is operatively coupled with communication network 320 and thereby also operatively coupled with mobile devices 301-302 and LDE 340.

Communication network 320 could be any network or collection of networks that couple, link, or otherwise operatively link mobile devices 301-302 with other mobile devices, PSAP 330, or LDE 340. It should be understood that communication network 320 may also link PSAP 330 with LDE 340. In addition, other secondary data networks could be used. In an example, communication network 320 may include a backhaul network, a wireless network, a local network, a long distance network, or a packet network, or any combination thereof, as well as other types of networks.

Mobile devices 301 or 302 may be any device, system, or other such communication platform capable of communicating with LDE 340 or PSAP 330 via base station 322, link 326, and communication network 320. Mobile devices 301 or 302 may be, for example, a mobile phone, a wireless phone, a PDA, a wireless modem, or any combination thereof, as well as any other type of device or system. Other types of communication platforms are possible.

LDE 340 may be part of, for example, a mobile switching center, a soft switch, a media gateway controller, or any combination or variation thereof, as well as another type of call locating system. Location determining equipment 340 could be any system or collection of systems, capable of determining an approximate location of mobile devices 301 or 302 and providing that location to emergency services or a PSAP.

It should be understood that location determining equipment 340 may include additional elements not pictured for the sake of clarity. For example, position determining equipment may be included. Furthermore, a gateway system may be included to interface between PSAP 330 and location determining equipment 340. An example of a gateway is an automatic location identification gateway or database query engine.

When a user needs emergency service, the user may dial 911 on mobile device 301 or 302. 911 is the official emergency phone number in the United States that callers can dial in order to reach dispatch personnel at a PSAP 330. When a caller dials 911 from a mobile device 301 or 302, signaling that details an emergency service call is transmitted by mobile device 301 or 302 to base station 322. This signaling contains a call request.

Communication network 320 receives a call request from mobile device 301 via base station 322 and link 326 for an emergency service call. Once set up, this emergency service call may be coupled by communication network 320 to PSAP 330. As part of this call request or a call setup, communication network 320 may receive an ESN, MEID, or IMEI.

As previously explained, an ESN is the unique identification number embedded or inscribed on the microchip in a wireless phone by the manufacturer. Each time a call is placed, the ESN is automatically transmitted to communication network 320 so that the call's validity may be checked. In general, the ESN cannot easily be altered in the field. An MEID or IMEI is a globally unique identification number for a physical piece of mobile station equipment. MEIDs or IMEIs are 'burned' into a device, to be resistant to modification. MEIDs and IMEIs are used as a means to facilitate mobile equipment identification and tracking. MEIDs and IMEIs are capable of being transmitted over the air upon a request from the network.

Communication network 320 may communicate the ESN, MEID, or IMEI to LDE 340. LDE 340 or computer system 370 may derive a device identifier from all or part of an ESN, MEID, or IMEI. In an alternative, all of an ESN, MEID, or IMEI may be used as the device identifier.

The device identifier may be used by computer system 370 or another part of LDE 340 to query location capability database 350. Location capability database 350 may be queried by computer system 370 to determine if the device identifier is in location capability database 350. Location capability database 350 may also be queried by computer system 370 to retrieve a stored location capability.

In an embodiment, location capability database 350 may contain stored entries that detail an association between each device identifier and a location capability. The different location capabilities may include Assisted-GPS (A-GPS), Advanced Forward Link Trilateration (A-FLT), Timing Advance/Network Measurement Report (TA/NMR), or Enhanced Observed Time Difference (E-OTD). In addition, the location capability database 350 may contain entries that correspond to legacy devices without any location capability in the device.

Each of the capabilities may be assigned a number in location capability database 350. For example, zero (0) may correspond to a legacy device without any location capability. One (1) may correspond to a device that has the capability to be located using A-FLT. Two (2) may correspond to a device that has the capability to be located using A-GPS, and so on.

In an embodiment, location capability database 350 is maintained in a manner that limits or excludes entries with a default location capability. For example, device identifier to location capability associations that result in a default location capability of A-GPS may be limited to less than ten percent (10%) of all the entries. In another example, device identifier to location capability associations that result in a default location capability of A-GPS may be excluded altogether. It should be understood that other location capabilities may be chosen as the default location capability.

Computer system 370 may query location capability database 350 to determine if the device identifier of mobile device 301 is in location capability database 350. If the device identifier of mobile device 301 is not in location capability database 350, then computer system 370 assigns the default location capability to be associated with mobile device 301. In this case, the default location capability is provided to other parts of LDE 340. LDE 340 uses this default location capability to determine a location of mobile device 301. The location of mobile device 301 as determined by LDE 340 may be provided to PSAP 330.

Computer system 370 may query location capability database 350 to determine if the device identifier of mobile device 302 is in location capability database 350. If the device identifier of mobile device 302 is in location capability database 350, then the stored location capability is assigned to be associated with mobile device 302. In this case, the stored location capability is provided to LDE 340. LDE 340 uses this stored location capability to determine a location of mobile device 302. The location of mobile device 302 as determined by LDE 340 may be provided to PSAP 330.

Figure 4:
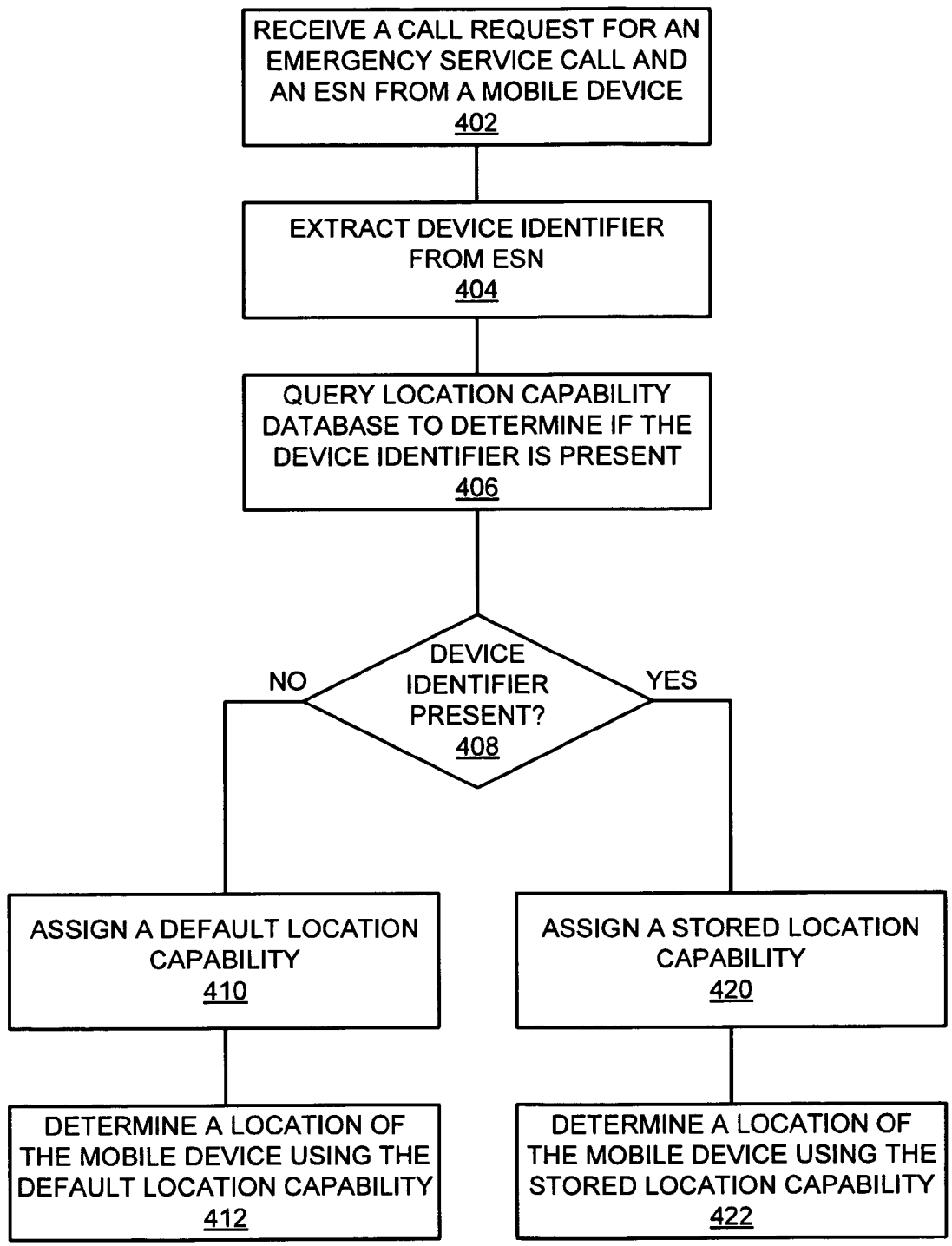
FIG. 4 is a flowchart illustrating a method of operating a communication system to process emergency service calls.

FIG. 4 is a flowchart illustrating a method of operating a communication system to process emergency service calls. The steps illustrated in FIG. 4 may be performed by communication system 100 or communication system 300. In the following discussion, it should be understood that the term ESN is being used for brevity. The term ESN is intended to encompass MEIDs, or IMEIs or any other form of identification that may be used as a basis for identifying the location capabilities of a mobile device.

A call request for an emergency service call and an ESN are received from a mobile device (402). For example, communication network 320 may receive a call request for an emergency service call from mobile device 301 or 302. Communication network 320 may communicate the ESN to LDE 340 and/or computer system 370.

A device identifier is extracted from the ESN (404). For example, computer system 370 may derive a device identifier from all or part of the ESN. In an alternative, all of the ESN may be used as the device identifier.

A location capability database is queried to determine if the device identifier is present (406). For example, computer system 370 may query location capability database 350 to determine if the device identifier associated with mobile device 301 or 302 is present.

A test is performed to determine if the device identifier was present (408). If the device identifier was not present, flow proceeds to blocks 410 and 412. If the device identifier was present, flow proceeds to blocks 420 and 422.

If the device identifier was not present, a default location capability is assigned (410). For example, computer system 370 may assign the default location capability to be associated with mobile device 301. This default location capability may be communicated to other parts of LDE 340.

A location of the mobile device is determined using the default location capability (412). For example, LDE 340 may determine a location for mobile device 301 using the default location capability assigned in block 410. In another example, LDE 340 may determine a location for mobile device 301 using a default location capability corresponding to A-GPS. The location determined in block 412 may be communicated to PSAP 330.

If the device identifier was present, a stored location capability is assigned (420). For example, computer system 370 may assign the stored location capability it retrieved from location capability database 350 to be associated with mobile device 302. This stored location capability may be communicated to other parts of LDE 340.

A location of the mobile device is determined using the stored location capability (422). For example, LDE 340 may determine a location for mobile device 302 using the stored location capability assigned in block 420. In another example, LDE 340 may determine a location for mobile device 302 using a stored location capability corresponding to legacy devices without a location capability. In another example, LDE 340 may determine a location for mobile device 302 using a stored location capability corresponding A-FLT. The location determined in block 422 may be communicated to PSAP 330.

Figure 5:
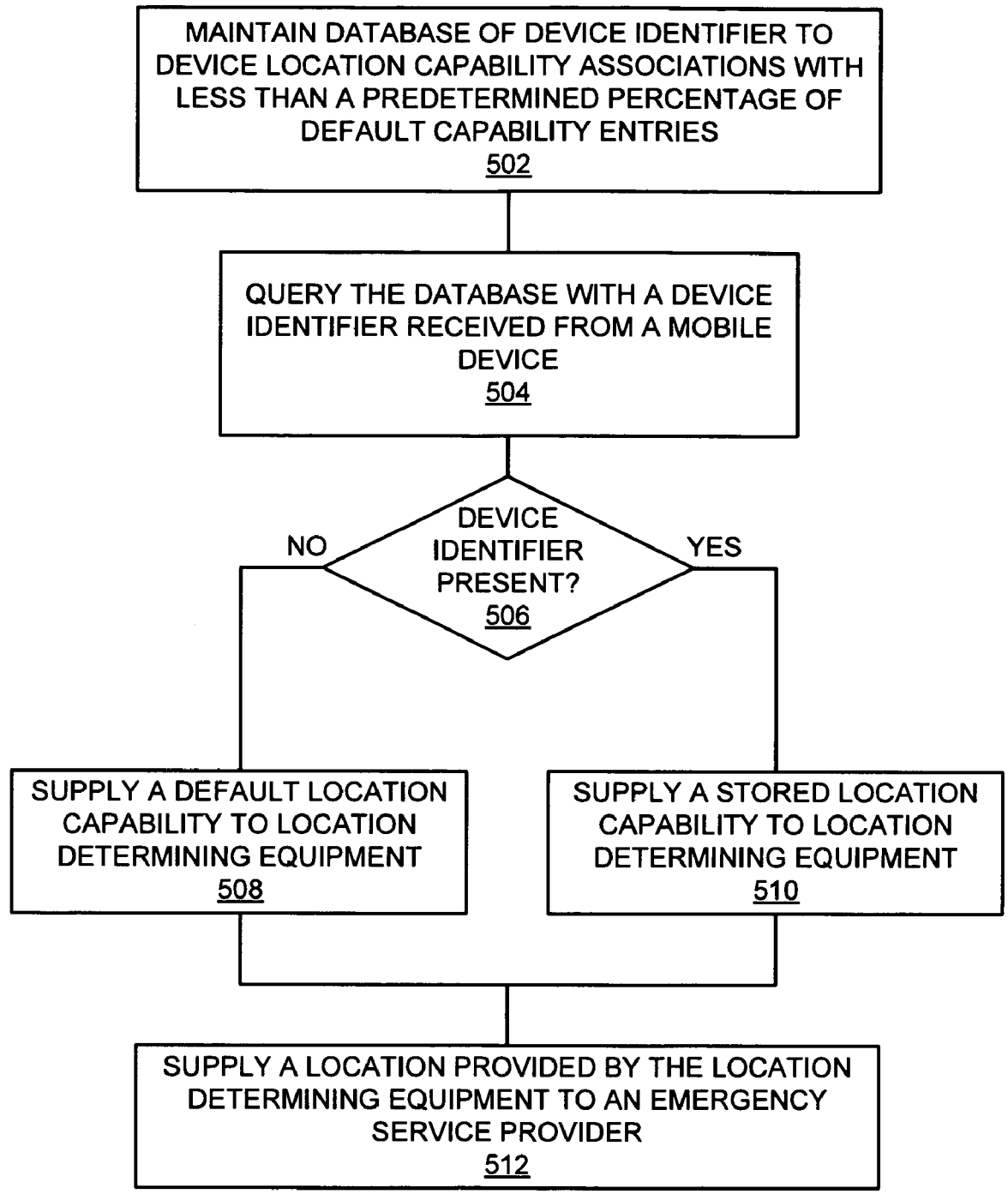
FIG. 5 is a flowchart illustrating a method of operating a communication system to process emergency service calls.

FIG. 5 is a flowchart illustrating a method of operating a communication system to process emergency service calls. The steps illustrated in FIG. 5 may be performed by communication system 100 or communication system 300.

A database of device identifier to device location capability associations that has less than a predetermined percentage of default capability entries is maintained (502). For example, location capability database 350 may be maintained in a manner that limits or excludes entries with a default location capability. In another example, device identifier to location capability associations that result in a default location capability of A-GPS may be limited to less than ten percent (10%) of all the entries. In another example, device identifier to location capability associations that result in a default location capability of A-GPS may be excluded altogether. It should also be understood that other location capabilities may be chosen as the default location capability.

The database is queried with a device identifier received from a mobile device (504). For example, location capability database 350 may be queried with a device identifier derived from an ESN received from mobile device 301 or 302.

A test is performed to determine if the device identifier was present (506). If the device identifier was not present, the flow proceeds to block 508 and then block 512. If the device identifier was present, the flow proceeds to block 510 and then block 512.

If the device identifier was not present, a default location capability is supplied to location determining equipment (508). For example, if the device identifier for mobile device 301 was not present in location capability database 350, then computer system 370 may supply a default location capability to LDE 340.

If the device identifier was present, a stored location capability is supplied to location determining equipment (510). For example, if the device identifier for mobile device 302 was present in location capability database 350, then computer system 370 may supply the stored location capability it retrieved from location capability database 350 to LDE 340.

A location provided by location determining equipment is supplied to an emergency service provider (512). For example, a location determined by LDE 340 using either the default location capability or a stored location capability may be supplied to PSAP 330 via communication network 320.

The methods, systems, devices, equipment, networks, databases, base stations, and links described above may be implemented with, contain, or be executed by one or more computer systems. The methods described above may also be stored on a computer readable medium. Many of the elements of communication network 100 and communication network 300 may be, comprise, or include computers systems. This includes, but is not limited to: caller 101; communication network 120; PSAP 130; LDE 140; location capability database 150; mobile device 301; mobile device 302; base station 322; link 326; communication network 320; PSAP 330; LDE 340; computer system 370; and, location capability database 350.

Figure 6:
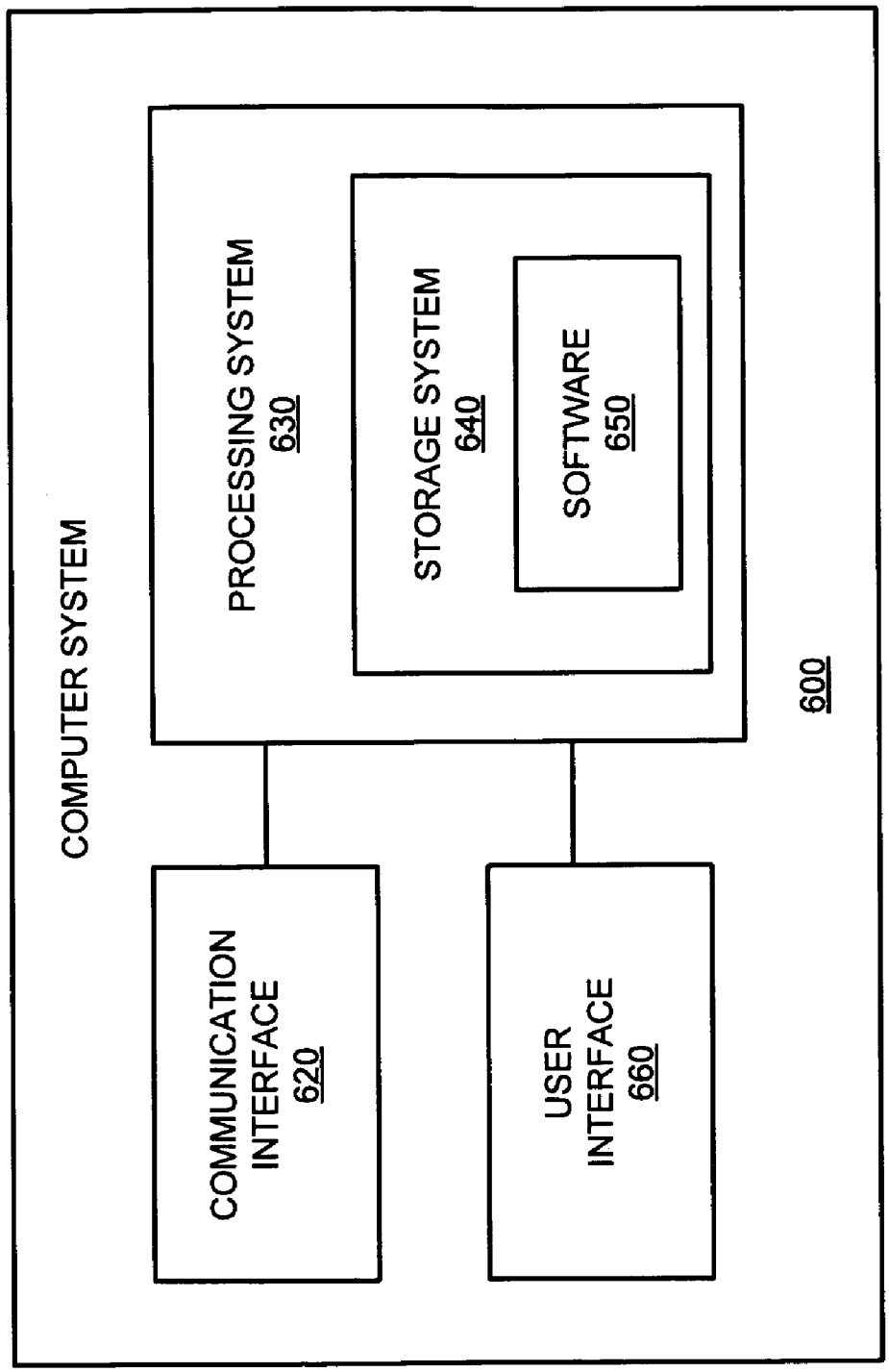
FIG. 6 is a block diagram illustrating a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

As discussed above, it should be understood that some old phones have little to no location capabilities, and there are still many hundreds of thousands of customers that use these phones. Previously, whenever a new phone model was introduced, the location capability database would be updated with the new phone model. Because there are a large number of new models introduced each month, it is time consuming and cumbersome to continually update the location capability database with each new phone model.

Using the aforementioned embodiments however, only older phones with little to no location capabilities are stored in the database. This removes the need to update the database whenever a new phone is introduced. Thus, the process of maintaining the location capability database is simplified and resources are saved.

Calling phones may still be located because rather than look-up the specific location capability of each phone in response to an emergency service call, the system checks to see if the model of the calling phone is even in the database. If not, the system assumes that the phone has the most recent capability (e.g. A-GPS) and proceeds to locate the phone using this capability. If the phone is in the database, then the network proceeds to lookup the older location capabilities (if any) that can be used to locate the phone. Thus, mobile devices placing calls for emergency services may still be located without continually updating a location capabilities database with each new phone model.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to process emergency service calls, comprising:

receiving a call request for an emergency service call from a mobile communication device, wherein the call request includes a device identifier for the mobile communication device;

querying a location capability database using the device identifier to determine if the device identifier is in the location capability database;

assigning a default location capability that corresponds to assisted-GPS location capability if the device identifier is not in the location capability database; and, determining a location of the mobile communication device using the default location capability if the device identifier is not in the location capability database.

2. The method of claim 1, further comprising:

assigning a stored location capability based on an entry in the location capability database if the device identifier is in the location capability database; and, determining the location of the mobile communication device using the stored location capability if the device identifier is in the location capability database.

3. The method of claim 2, wherein the mobile communication device stores an electronic serial number and the electronic serial number includes at least the device identifier.

4. The method of claim 3, wherein the location capability database only contains entries corresponding to devices without assisted-GPS location capability.

5. The method of claim 4, wherein the entries corresponding to devices without assisted-GPS location capability includes at least legacy devices and advanced forward link trilateration location capability only devices.

6. A communication system that processes emergency service calls, comprising:

an emergency service call receiver that receives a call request for an emergency service call and a device identifier from a mobile communication device;

a location capability database that is indexed using the device identifier;

wherein a default location capability that corresponds to assisted-GPS location capability is assigned by the communication system if the device identifier is not in the location capability database; and, location determining equipment that determines a location of the mobile communication device using the default location capability.

7. The communication system of claim 6, wherein the communication system assigns a stored location capability based on an entry in the location capability database if the device identifier is in the location capability database; and, wherein the location determining equipment determines a location of the mobile communication device using the stored location capability.

8. The communication system of claim 7, wherein the mobile communication device stores an electronic serial number and the electronic serial number includes at least the device identifier.

9. The communication system of claim 8, wherein the location capability database only contains entries corresponding to devices without assisted-GPS location capability.

10. The communication system of claim 9, wherein the entries corresponding to devices without assisted-GPS location capability includes at least legacy devices and advanced forward link trilateration location capability only devices.

11. A program storage device readable by a machine, tangibly embodying a program of instructions executable by the machine to perform method steps for operating a communication system to process emergency service calls, the method comprising:

receiving a call request for an emergency service call from a mobile communication device, wherein the call request includes a device identifier for the mobile communication device;

querying a location capability database using the device identifier to determine if the device identifier is in the location capability database;

assigning a default location capability that corresponds to assisted-GPS location capability if the device identifier is not in the location capability database; and, determining a location of the mobile communication device using the default location capability if the device identifier is not in the location capability database.

12. The program storage device of claim 11, the method further comprising:

assigning a stored location capability based on an entry in the location capability database if the device identifier is in the location capability database; and, determining the location of the mobile communication device using the stored location capability if the device identifier is in the location capability database.

13. The program storage device of claim 12, wherein the mobile communication device stores an electronic serial number and the electronic serial number includes at least the device identifier.

\* \* \* \* \*